(12) United States Patent
Uetabira

(10) Patent No.: US 9,344,414 B2
(45) Date of Patent: May 17, 2016

(54) USER SIMILARITY PROVISION METHOD

(71) Applicant: INTERMAN Corporation, Kagoshima-shi, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 74 days.

(21) Appl. No.: 13/757,384

(22) Filed: Feb. 1, 2013

(65) Prior Publication Data

US 2014/0221012 A1    Aug. 7, 2014

(51) Int. Cl.
*H04L 29/06* (2006.01)
*H04W 4/02* (2009.01)

(52) U.S. Cl.
CPC ............. *H04L 63/08* (2013.01); *H04W 4/023* (2013.01); *H04W 4/028* (2013.01)

(58) Field of Classification Search
CPC ....... H04W 4/028; H04W 4/02; H04W 64/00; H04W 12/06; H04W 4/023; H04W 4/206; H04W 84/18; G01S 5/0009; G01S 5/0018; G01S 5/0289; G06F 17/30061; G06F 17/30241; G06F 17/30598; G06F 17/3087
USPC .......................... 455/404.2, 422.1, 456.1–457
See application file for complete search history.

(56) References Cited

U.S. PATENT DOCUMENTS

| 7,424,541 | B2 * | 9/2008 | Bourne | 709/227 |
| 2008/0250337 | A1 * | 10/2008 | Lemmela | G09B 29/006 715/764 |
| 2009/0292782 | A1 * | 11/2009 | Kim | H04W 4/02 709/206 |
| 2012/0047150 | A1 * | 2/2012 | Spiegel | G06Q 30/02 707/748 |
| 2012/0184287 | A1 * | 7/2012 | Jovicic et al. | 455/456.1 |
| 2013/0288701 | A1 * | 10/2013 | Foster | 455/456.1 |
| 2014/0039840 | A1 * | 2/2014 | Yuen | A61B 5/6838 702/189 |

(Continued)

FOREIGN PATENT DOCUMENTS

JP    H10301950 A    11/1998
JP    203505788 A    2/2003

(Continued)

OTHER PUBLICATIONS

Takao Imazawa et al.; "Positional Authentication System Using GPS Data and the Stopping Point Calculating Method"; Computer Security Symposium 2008 Proceedings [Part II]; Japan, Information Processing Society of Japan; Oct. 8, 2008; vol. 2008; No. 8, pp. 707-712.

(Continued)

*Primary Examiner* — George Eng
*Assistant Examiner* — Umair Ahsan
(74) *Attorney, Agent, or Firm* — Maier & Maier, PLLC

(57) ABSTRACT

A user similarity provision method for providing mobile communication devices with information about common interests among first and second users of the mobile communication devices is described. The current position of each mobile communication device are periodically acquired in association with the current time and accumulated as a visited location history. The visited location history consists of location visited records each of which consists of a visited location and a visit time. Similar visited location records are extracted from the visited location histories of the first and second users to indicate common interests shared by them. The similar visited location records are then displayed on the mobile communication devices.

14 Claims, 12 Drawing Sheets

(56) References Cited

U.S. PATENT DOCUMENTS

| | | | |
|---|---|---|---|
| 2014/0045530 A1* | 2/2014 | Gordon et al. | 455/456.2 |
| 2014/0106785 A1* | 4/2014 | Hawkins et al. | 455/456.3 |
| 2015/0106443 A1* | 4/2015 | Jensen | H04L 51/32 709/204 |
| 2015/0256973 A1* | 9/2015 | Raounak | H04L 67/22 726/7 |
| 2015/0287091 A1* | 10/2015 | Koran | G06Q 30/0269 705/14.66 |

FOREIGN PATENT DOCUMENTS

| | | |
|---|---|---|
| JP | 2005202653 A | 7/2005 |
| JP | 2005228154 A | 8/2005 |
| JP | 2006144421 A | 6/2006 |
| JP | 2006285357 A | 10/2006 |
| JP | 2008158683 A | 7/2008 |
| JP | 2009141513 A | 6/2009 |
| JP | 2009289172 A | 12/2009 |
| JP | 2010039869 A | 2/2010 |
| JP | 2010165097 A | 7/2010 |
| JP | 2010267105 A | 11/2010 |
| JP | 2011-070341 A | 4/2011 |

OTHER PUBLICATIONS

Yuuki Ishihara et al; Path-Pass: The Authentication System Using Location Information; Graduate school of Information System, The University of Electro-Communications; Tokyo, Japan; Oct. 2006; pp. 537-542.

Japanese Office Action from Japanese Application No. 2011-149277; Dec. 19, 2014; 6 pgs.

Eiji Okamoto et al; "Cryptogram TeTechnology for Realization of a Bright Information Society: 5 Distribution Management of Cipher Keys"; Bit, vol. 23, No. 12; Nov. 1, 1991, Kyoritsu Shuppan Co., Ltd., pp. 51-59.

Japanese Office Action from corresponding Japanese Application No. 2011-166850; Dec. 19, 2014; 6 pgs.

Japanese Office Action dated Apr. 10, 2015, in connection with corresponding JP Application No. 2011-175339 (4 pgs., English translation only).

Japanese Office Action dated Apr. 10, 2015, in connection with corresponding JP Application No.2011-175339 (7 pgs.).

* cited by examiner

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00014238 | 20110828 | 113229 | 35.415915 | 139.658804 | 10922 | 78 |
| 00014239 | 20110828 | 153437 | 35.413829 | 139.653372 | 10932 | 81 |
| ⋮ | ⋮ | ⋮ | ⋮ | ⋮ | ⋮ | ⋮ |

ID: 415bfa41

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00012247 | 20110828 | 114832 | 35.415915 | 139.658804 | 10919 | 70 |
| 00012248 | 20110828 | 153056 | 35.413312 | 139.660393 | 10922 | 70 |
| ⋮ | ⋮ | ⋮ | ⋮ | ⋮ | ⋮ | ⋮ |

Fig. 3

| ID | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 415bfa41 | 20111003 | 181122 | 35.668781 | 139.549802 | 10922 | 82 |
| 0bfa4911 | 20111003 | 181131 | 35.681370 | 139.748938 | 10916 | 81 |
| ⋮ | ⋮ | ⋮ | ⋮ | ⋮ | ⋮ | ⋮ |

Fig. 5

Records of Nearby Users Correlated with You

| ID | Place (or thereabouts) | Date | Time | Staying |
|---|---|---|---|---|
| 415bfa41 | Honmoku Local Park in Yokohama | 2011/08/28 (2011/08/28) | 11:48 (11:32) | 4:25 (4:32) |
| 07f53811 | Nissan Stadium | 2011/09/03 (2011/10/30) | 15:48 (15:32) | 2:18 (2:13) |
| ⋮ | ⋮ | ⋮ | ⋮ | ⋮ |

( User Search )

Fig. 6

Records of User (415bfa41) Correlated with You

( Send Message )

| Place (or thereabouts) | Date | Time | Staying |
|---|---|---|---|
| Honmoku Local Park in Yokohama | 2011/08/28 (2011/08/28) | 11:48 (11:32) | 4:25 (4:32) |
| Yokohama WORLD PORTERS | 2011/08/12 (2011/08/12) | 11:37 (11:32) | 2:38 (2:32) |
| ⋮ | ⋮ | ⋮ | ⋮ |

Fig. 17

USER SEARCH

Place: (required) | Honmoku Local Park in Yokohama

Date: 2011/08/28   Time: 12:00   滞在時間: 2:00

Search

Fig. 18

USER SEARCH RESULTS

| ID | Place (or thereabouts) | Date | Time | Staying |
|---|---|---|---|---|
| 415bfa41 | Honmoku Local Park in Yokohama | 2011/08/28 | 11:48 | 4:25 |
| 318f5107 | Honmoku Local Park in Yokohama | 2011/08/28 | 11:55 | 3:18 |
| ⋮ | ⋮ | ⋮ | ⋮ | ⋮ |

Fig. 22

TIME/PLACE BBS  *Search*

TITLE: *2011/08/28:Honmoku Local Park in Yokohama*

( POST )

1 :(anonymous) 2013/01/11(Fri) 13:32
   Unfortunately, I could not visit Honmoku to enjoy the jazz festival (2011/08/28). Could you kindly let me know what time the festival actually ended ?

2 :(anonymous) 2013/01/11(Fri) 13:44
   As far as I remember, the festival ends at around 4 p.m.

Fig. 23

*Post a Reply*

Date/Time:  2011/08/28

Place:  Honmoku Local Park in Yokohama

Name:

Message:  As far as I remember, the festival ends at around 4 p.m.

( OK )    ( CANCEL )

Fig. 24

*DATA SEARCH*

Place: (required)  Honmoku Local Park in Yokohama

Date:  2011/08/28

( Search )

USER SIMILARITY PROVISION METHOD

FIELD OF THE INVENTION

The present invention relates to a user similarity provision method for providing mobile communication devices with information about common interests among users of the mobile communication devices.

DISCUSSION OF THE PRIOR ART

In recent years, smartphones, cellular phones, PHS (Personal Handyphone System) and the like mobile terminals have continued to spread into a broad range of applications. Besides basic verbal communication functionality, the data communication capabilities of these terminals have been enhanced to provide users with a variety of information services through the Internet. Particularly, a variety of service making use of current location information provided by GPS or the like (for example, as described in Japanese Patent Published Application No. 2011-070341).

However, many currently available services are designed to make use of location information only for informing the user of the current location of a mobile communication device, tracking the movement of the user, or giving the user the information in the vicinity of the current location.

It is an object of the present invention to provide a user similarity provision method which compares the visited location history of one user to the visited location history histories of other user(s) and provides the one user with the information about another user sharing common interests with the one user.

SUMMARY OF THE INVENTION

To achieve at least one of the abovementioned objects, a computer implemented method of the present invention is a user similarity provision method of providing information about similarities between first and second users who are using first and second mobile communication devices, each of which is capable of detecting the current location thereof as a visited location, said method comprising the steps of: periodically acquiring the current position of the first mobile communication device in association with the current time and accumulating a first visited location history of the first mobile communication device on the basis of the acquired current position and time, wherein the first visited location history consists of location visited records, and each visited location record consists of a visited location and a visit time; periodically acquiring the current position of the second mobile communication device in association with the current time and accumulating a second visited location history of the second mobile communication device on the basis of the acquired current position and time, wherein the second visited location history consists of location visited records, and each visited location record consists of a visited location and a visit time; extracting similar visited location records from the first visited location history, wherein each of the similar visited location records satisfies a predetermined similarity relationship with a visited location record of the second visited location history, the predetermined similarity relationship indicating similarity between visited location records; and displaying the similar visited location records on the second mobile communication device.

Preferably, in the invention as described above, the predetermined similarity relationship requires that the distance between visited locations is no greater than a predetermined distance.

Preferably, in the invention as described above, the visited location is represented by the degrees of latitude and longitude.

Preferably, in the invention as described above, each visited location history includes a staying period for which the mobile communication device has stayed in the visited location of a visited location record.

Preferably, in the invention as described above, the staying period of each visited location record corresponds to the differential visit time between this each visited location record and the visited location record subsequent to this each visited location record.

Preferably, in the invention as described above, of the similar visited location records, a records having a staying period overlapping the staying period of the corresponding visited location record of the second visited location history for a longer period is given a higher priority.

Preferably, in the invention as described above, each of the first and second mobile communication devices detect the current location by the use of a GPS, Wi-Fi triangulation, cell phone tower triangulation or any combination thereof.

Preferably, in the invention as described above, each of the first and second mobile communication devices is capable of accessing the Internet, and wherein the visited location records are transmitted from each of the first and second mobile communication devices to a visited location history matching server on the Internet, and accumulated as a visited location history in the visited location history matching server.

Preferably, in the invention as described above, there are a plurality of mobile communication devices each of which is the first mobile communication device and located in the vicinity of the second mobile communication device.

Preferably, in the invention as described above, the first visited location history is stored in the first mobile communication device, and the second visited location history is stored in the second mobile communication device.

BRIEF DESCRIPTION OF THE DRAWINGS

The objects and features of the present invention will become more apparent from consideration of the following detailed description taken in conjunction with the accompanying drawings in which:

FIG. 2 is a view for showing history tables of a history database corresponding to the mobile communication devices of users respectively for use in the user similarity provision method in accordance with the embodiment 1 of the present invention.

FIG. 3 is a schematic diagram for showing a current location table of a history database for use in the user similarity provision method in accordance with the embodiment 1 of the present invention.

FIG. 5 is a view for showing an example of a list which is displayed on one mobile communication device and contains location records of other mobile communication devices correlated with the location history of the one mobile communication.

FIG. 6 is a view for showing an example of a list containing the location records of a particular mobile communication devices selected from among the other mobile communication devices correlated with the location history of the one mobile communication.

FIG. 17 is a view for showing a search screen for finding information associated with a particular place and a particular time by the use of the user similarity provision method in accordance with an embodiment 4 of the present invention.

FIG. 18 is a view for showing a search result screen of the user similarity provision method in accordance with the embodiment 4 of the present invention.

FIG. 22 is a view for showing a thread screen of the BBS in accordance with the embodiment 4 of the present invention.

FIG. 23 is a view for showing a message edit screen for posting a reply message to the BBS in accordance with the embodiment 4 of the present invention.

FIG. 24 is a view for showing a search screen for finding information through the BBS in accordance with the embodiment 4 of the present invention.

DESCRIPTION OF THE PREFERRED EMBODIMENTS

In what follows, user similarity provision methods in accordance with several embodiments of the present invention will be explained with reference to the accompanying drawings. It is assumed that mobile communication devices for use in the user similarity provision methods are capable of acquiring the current location information and accessing the Internet. More specifically speaking, these mobile communication devices include conventional feature phones, multi-function terminals called smartphones having touch-panel screens, tablet computers, notebook computer and the like. The location information of a mobile communication device can be provided from GPS, Wi-Fi triangulation, cell phone tower triangulation or any combination thereof.

Incidentally, while the location information of each user is accumulated in a server or a mobile communication device of the user in the following embodiments, it is easy to identify the address of the user's home and the location of the working place or school from the location information history. For example, in the location information history, there may appear location records indicating that the user has stayed home every night and location records indicating that the user has stayed in the working place or school for substantial periods in weekdays. On the other hand, in holidays, there are few location records corresponding to the working place or school. Depending upon the case, this may not be preferred from the view point of privacy. Accordingly, it is preferred to exclude these location records having such patterns from the location information history.

Embodiment 1

Figure 1:
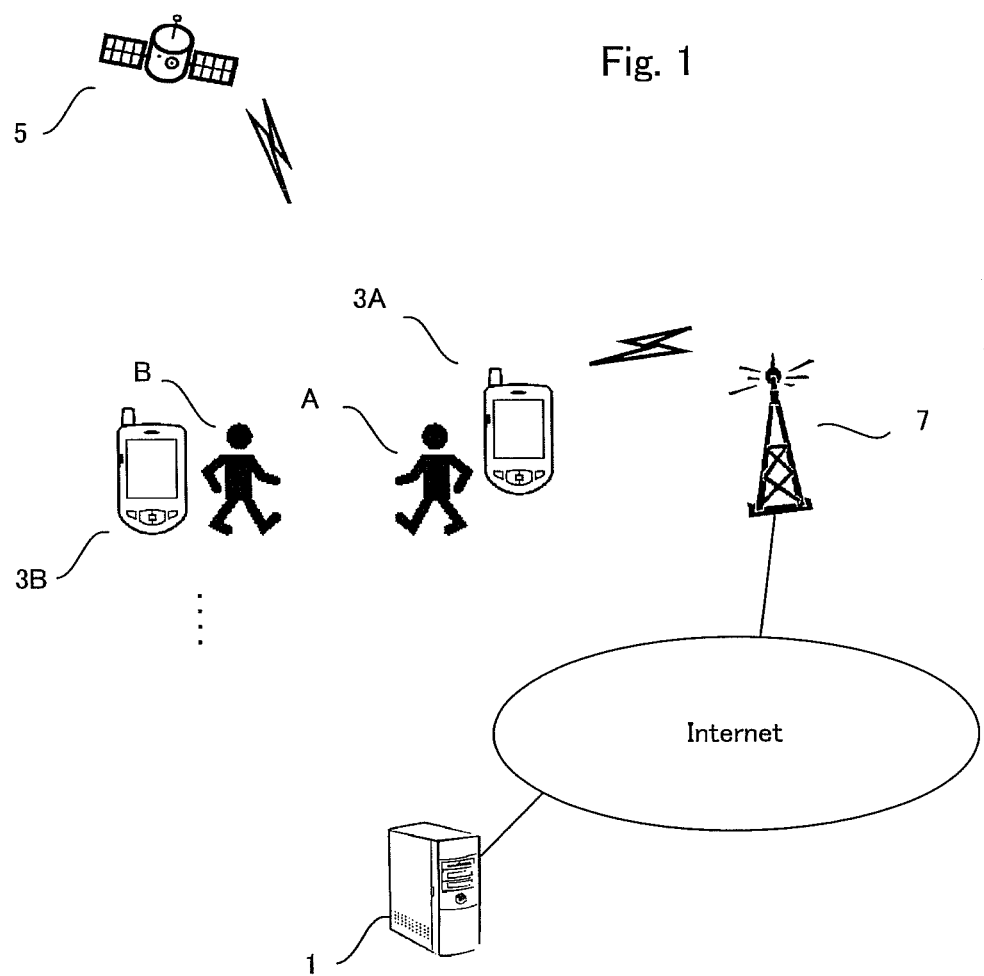
FIG. 1 is a view for explaining a user similarity provision method in accordance with an embodiment 1 of the present invention.

Referring to FIG. 1, a user similarity provision method according to the embodiment 1 will be explained. This method is performed by a visited location history matching server 1 which is connected to the Internet. A user who wants to use this user similarity provision method has to download a resident program from a server and install the resident program in a mobile communication device carried by the user.

This resident program acquires the current location information of the mobile communication device and transmits this current location information to the visited location history matching server 1. Needless to say, while only two users, i.e., a user A carrying a mobile communication device 3A and a user B carrying a mobile communication device 3B are illustrated in FIG. 1 as the users of this user similarity provision method, it is assumed that there are a number of other users using this system.

The visited location history matching server 1 manages visited location histories of users with a history database, which includes history tables 2 which are provided for mobile communication devices respectively as illustrated in FIG. 2. Each history table 2 contains location records each of which includes a field holding a date, a field holding a time, a field holding a latitude, a field holding a longitude, a field holding a Cell-ID, and a field holding a receiving sensitivity. In response to a timer event, the resident program creates a location record indicating that the mobile communication device has been located in the current location stored in the latitude and longitude fields on the date and time stored in the date and time fields and communicated with a base station 7 identified by the Cell-ID field with the receiving sensitivity stored in the receiving sensitivity field.

Each history table 2 is associated with a terminal ID which is allocated to each user when downloading the resident program and unique to this each user. The location records contained in each history table 2 are arranged in a time series with serial numbers. That is to say, each history table 2 is uniquely correlated to an individual terminal ID. When transmitting current location information to the visited location history matching server 1, the resident program transmits this terminal ID as well as a Cell-ID and a receiving sensitivity in the form of a location record. In place of the terminal ID allocated by the server, an identification number associated with an individual terminal such as ANDROID_ID may be used for the same purpose. Specifically speaking, the resident program periodically acquires the current location information, i.e., the latitude and longitude of the mobile communication device provided from GPS or the like at intervals of several minutes (for example, every five minutes in this case).

The history database of the visited location history matching server 1 includes a current location table in which are stored the current location information of each mobile communication device identified by the terminal ID as illustrated in FIG. 3. The current location table contains one location record for each mobile communication device, and includes fields corresponding to the fields contained in the history table, except for the serial number field which is replaced with a field for storing the terminal ID of each location record.

When receiving a current location information from a mobile communication device, the visited location history matching server 1 determines whether or not this mobile communication device is registered in the current location table on the basis of the terminal ID attached to the current location information. If not registered yet, a new location record is generated on the basis of this current location information, and stored in the current location table in correspondence with this terminal ID. Also, a history table is generated anew in correspondence with this terminal ID.

On the other hand, if already registered, the previous current location information (latitude and longitude) is acquired from the location record corresponding to the terminal ID, and compared with the current location information as received. If these latitude and longitude values are approximately the same (for example, only with a difference of at most 10 meters or the like), the current location information is discarded without further processing.

Conversely, if the current location information as received substantially differs from the previous current location information stored in the current location table, a new location record is added to the history table corresponding to the terminal ID on the basis of the location record of the current location table corresponding to the previous current location information. The location record of the current location table corresponding to this terminal ID is updated with the current location information, Cell-ID, receiving sensitivity and measurement date/time as received. Accordingly, the staying period for which the mobile communication device has stayed in the place designated by a certain location record corresponds to the differential time between this location record and the next location record in the history table.

For example, if a location record at 13:30 may be followed by a location record at 14:30 in the history table corresponding to a mobile communication device, the two location records indicates that the mobile communication device has been located in a certain place for a hour. Namely, if a sequence of location records have continuous time fields in units of cycles of measuring the current location, this sequence indicates that the user was in transit. Conversely, if adjacent location records have discrete time fields, these location records indicates that the user stayed in the place corresponding to the location field of the former location record thereof. Accordingly, the date and time fields of each location record appropriately indicate the date and time in which the mobile communication device has arrived (visited) at the place corresponding to the location field except that the user was in transit. The date, time and location of these fields will be called a visit date, a visit time and a visited location hereinbelow because the location records in transit are not important in this context. The Cell-ID and receiving sensitivity fields in the history table can be utilized, for example, for evaluating the reliability of the latitude and longitude. On the other hand, the staying period for which the mobile communication device has stayed in the place corresponding to the latest location record in the history table corresponds to the differential visit time between this latest location record and the location record in the current location table corresponding the terminal ID. Incidentally, the staying period in the current location corresponds to the difference between the current time and the visit time of the location record in the current location table corresponding the terminal ID.

Alternatively, each location record of the current location table may be stored as the latest location record in the history table corresponding to this each location record. Namely, the current location table consists of reference pointers to the latest location records of the history tables corresponding to the mobile communication devices respectively. In this case, the staying period can be calculated only in the history table.

Figure 4:
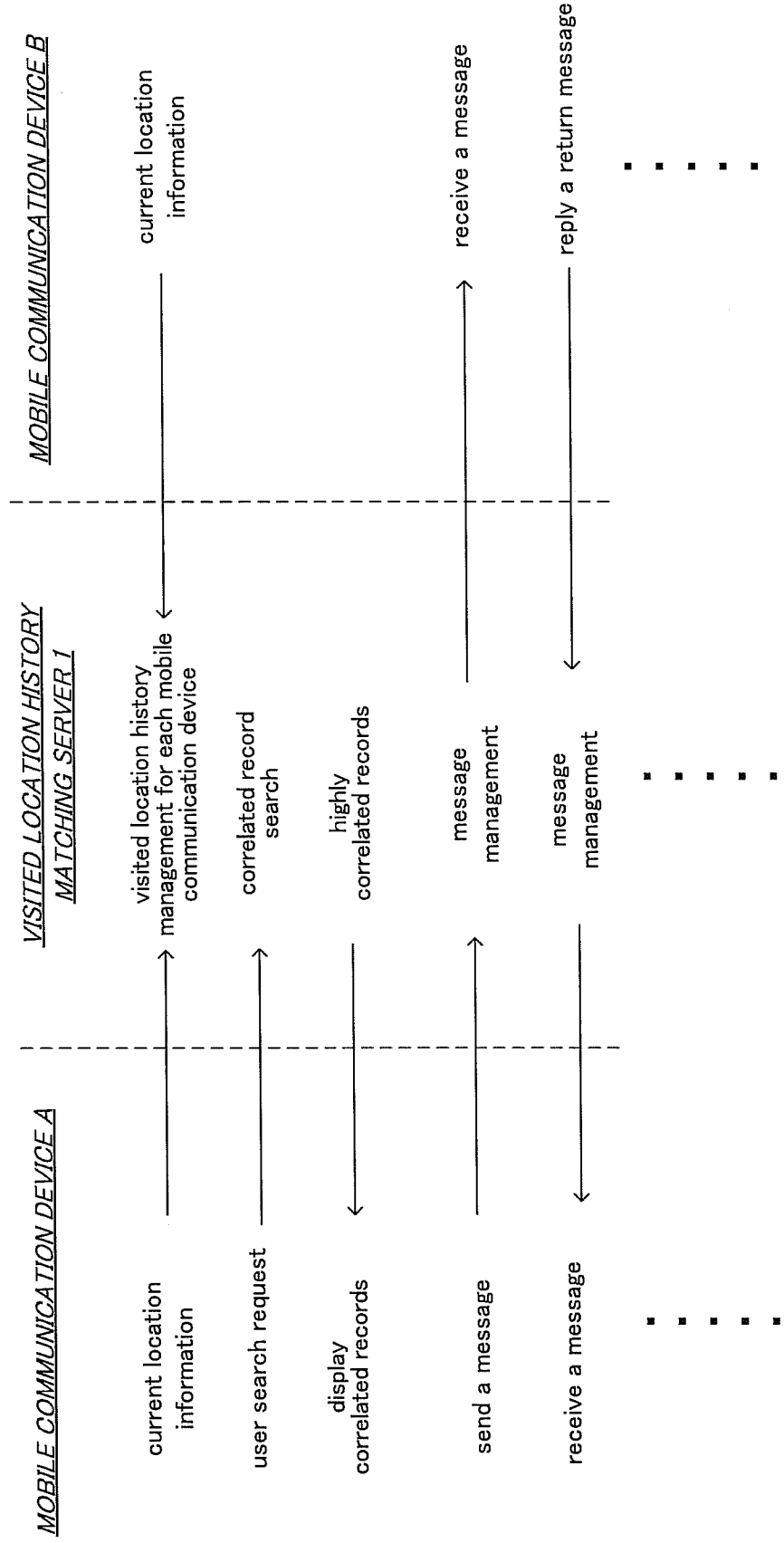
FIG. 4 is a view for explaining the exchange of signals in an actual usage scenario of the user similarity provision method in accordance with the embodiment 1 of the present invention.

Next, the user similarity provision method of this embodiment will be explained in accordance with an actual usage scenario. FIG. 4 is a view for explaining the information exchanging scheme of the visited location history matching system. For example, it is assumed that the user A with the mobile communication device 3A is having coffee in a cafe. He may want to talk to someone and take the mobile communication device 3A followed by clicking the icon of the resident program. Usually, since the resident program has already been opened (memory-resident) in the mobile communication device 3A, the resident program transmits a user search request to the visited location history matching server 1 rather than invoking a second instance. The user search request is transmitted together with the current location information and the terminal ID of the mobile communication device 3A.

When the user search request is received, the visited location history matching server 1 searches the current location table for identifying the users (mobile communication devices) located in the vicinity of the current location of the mobile communication device 3A. For example, the users within 50 meters from the mobile communication device 3A are identified. If the number of identified users is less than a predetermined number, for example, if only three or less users are identified, the search range is expanded so that, for example, the users within 100 meters are identified.

On the other hand, the history table corresponding to the terminal ID of the mobile communication device 3A is searched for extracting location records (hereinafter referred to as specific staying location records) each of which indicates that the user of the mobile communication device 3A has stayed for a predetermined period, e.g., one or more hours at the place corresponding to this location record. The visited location history matching server 1 then searches the history tables of the identified users for location records each of which satisfies a predetermined similarity relationship with one of the specific staying location records. The predetermined similarity relationship is satisfied by a location record if the staying period thereof is no shorter than a predetermined period, for example 30 minutes, and that the distance of the visited location from that of the specific staying location record is no greater than a predetermined distance, for example 1 km. The location records hit by this search are arranged in descending order of correlation with the visited location history of the mobile communication device 3A. This arrangement can be performed, for example, by the following procedure.

First, priority is given to the location record of a user who has stayed at the same visited location and same visit time of the specific staying location record. If there are a number of such location records, higher priority is given to the location record which indicates that the user of this location record and the user of the mobile communication device 3A have stayed together for a longer period. The record having a staying period overlapping the staying period of the specific staying location record for a longer period is given a higher priority.

Next, higher priority is given to a user who has stayed at the same visited locations as the user of the mobile communication device 3A (regardless whether or not at the same time) for a longer total period of the staying periods thereof.

FIG. 5 shows an example of the list of the above location records displayed on a mobile communication device. In this case, the highest priority is the location record at the top of the list indicating that the user of a terminal ID "415bfa41" has stayed near the Honmoku Local Park in Yokohama from 11:48 on Aug. 28, 2011 for 4 hours, 25 minutes. Also, the visit date, visit time and staying period of each location record are followed by brackets in which are shown the visit date, visit time and staying period of the mobile communication device 3A when staying the same place. Accordingly, it is known from the list that the user of the mobile communication device 3A has stayed with the user of the terminal ID "415bfa41" at the same place and the same time for more than four hours.

Incidentally, the names of places shown in the list can be obtained by reverse-geocoding of geographic coordinates (latitude and longitude) to street addresses and converting the street addresses to the names of places by the use of an online telephone book service. However, when an online telephone book cannot be used for this purpose for example in the middle of a mountain or an ocean, geographical names such as Mt. and * Coast are displayed by the use of a database in which geographic coordinates correspond to the names of the places. Since even GPS has some margin of error, expression "or thereabouts" is used for the names of places.

When clicking the name of a place ("The Honmoku Local Park" in this case), the resident program searches the Web with "The Honmoku Local Park" as a search term and displays search results. The user of the mobile communication device 3A may remember the time when he went to a jazz concert from the search result. Also, when clicking a terminal ID ("415bfa41" in this case), the location records of the user of the terminal ID can be extracted and displayed as illustrated in FIG. 6.

Figure 7:
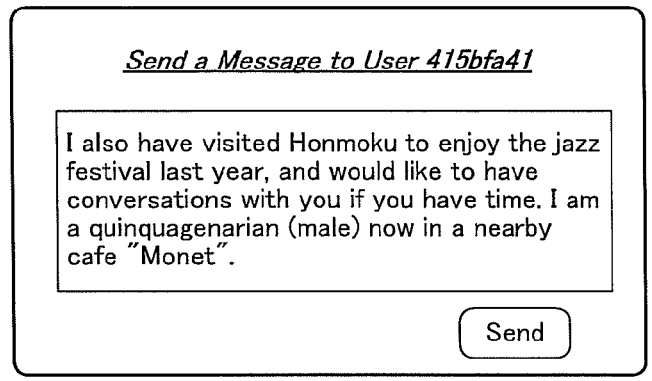
FIG. 7 is a view for showing a message edit screen for sending a message to another mobile communication device in accordance with the embodiment 1 of the present invention.

It is assumed that the user A wants to have a talk with the user B of the terminal ID "415bfa41". The user A then clicks a button "Send Message" to open a message edit screen as illustrated in FIG. 7. After inputting a message to the message edit screen, the user A can send the message to the mobile communication device 3B of the terminal ID "415bfa41" by clicking the "Send Message" button. Specifically, the visited location history matching server 1 first receives the message from the mobile communication device 3A. Next, when receiving current location information from the mobile communication device 3B, the visited location history matching server 1 transfers the message to the mobile communication device 3B together with an acknowledgement of the current location information.

Figure 8:
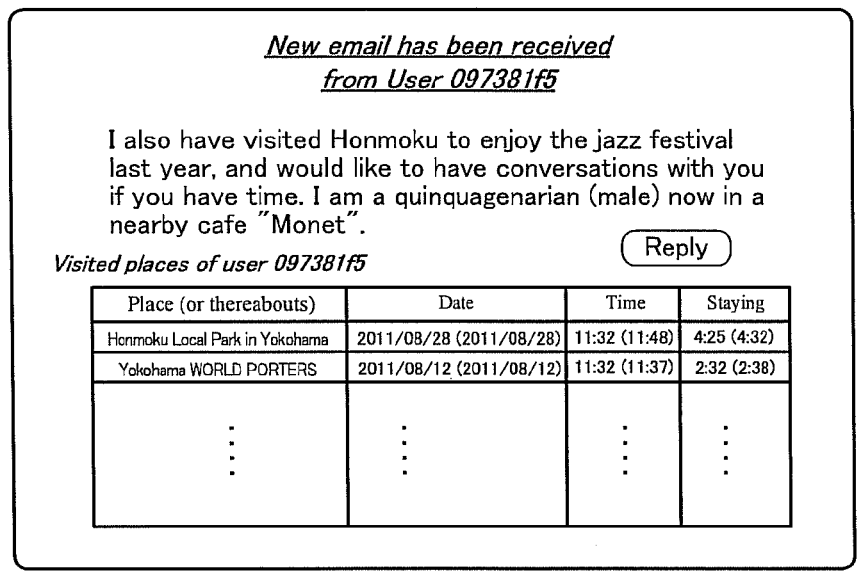
FIG. 8 is a view for showing a screen in which the received message is displayed in accordance with the embodiment 1 of the present invention.
Figure 9:
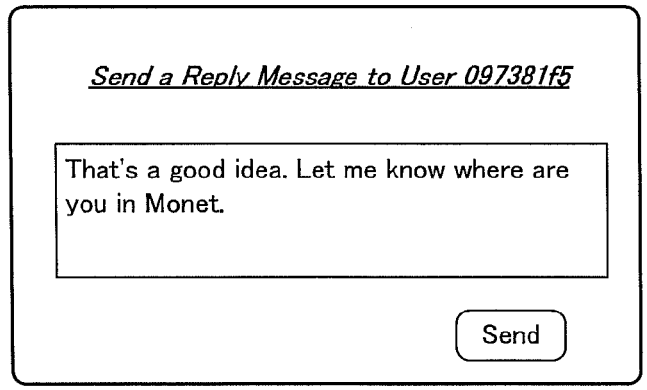
FIG. 9 is a view for showing a message edit screen for sending a reply message in accordance with the embodiment 1 of the present invention.

This message is accompanied with the visited location history of the user A in addition to the message body as edited as illustrated in FIG. 8. The location records of the visited location history are displayed in descending order of correlation with the visited location history of the mobile communication device 3B, so that the similar location records are displayed as FIG. 6. The user B can get certain information about what kind of person the user A is. The user B can send a reply to this message by clicking a "Reply" button to open a message edit screen as illustrated in FIG. 9, editing a reply message and clicking a "Send" button. The user A and the user B can exchange further messages if desired. Incidentally, the sending and receiving process is performed by the resident program installed in the mobile communication device 3A and the mobile communication device 3B and the visited location history matching server 1 in cooperation.

The above process of updating the location information history may includes routines of handling exceptions, i.e., that no location information is available, that the Internet cannot be accessed, and that the resident program has temporarily stopped its operation.

No location information is available, for example, when a sufficient number of GPS satellites cannot be found and Wi-Fi triangulation is not available. In such a case, rough location information is acquired by cell phone tower triangulation to generate a location record with a receiving sensitivity of 0 so that this location record is only reference information and cannot be used in this user similarity provision method. This location record serves also as a padding record between valid location records. The Internet cannot be accessed, for example, when the mobile communication device cannot have any reception. In such a case, the resident program saves location records in the mobile communication device and, when the Internet access becomes available, these location records are transmitted to the visited location history matching server 1. The resident program is temporarily stopped its operation, for example, when the battery of the mobile communication device runs out or when the mobile communication device is turned off. In such a case, after restarting, the resident program resumes transmission of location records. On the other hand, the location record, which is transmitted from the resident program just after restarting and received by the visited location history matching server 1, has a visit time which is not subsequent to the visit time of the latest location record (current location record) stored in the visited location history matching server 1, i.e., the difference between these visit times is longer than the current location acquiring interval. In this case, the visited location history matching server 1 generates an invalid location record subsequent to the latest location record in the history table and saves the received location record in the current location table. The visit date and visit time of the invalid location record are those of the location record which would have been received by the visited location history matching server 1 after receiving the latest location record if the resident program had not been stopped. The other fields of the invalid location record are set to 0 respectively to indicate that this record is invalid.

Incidentally, if no location information is available, the user can request the visited location history matching server 1 to insert a location record to the history table of the history database by designating a visit date, a visit time, a visit location and a staying period. In this case, the user can send an insertion request together with text such as "20130101: Hotel Okura in Toranomon (Tokyo) at 15:00 for 4 hours". For example, after posting a message reporting the visit, the text of the message can be used for this purpose. The visited location history matching server 1 parses the text to extract a visit date, a visit time, a visit location and a staying period, generates a location record from this information, and insert this location record into an appropriate position of the history table (which may be occupied by an invalid record) in accordance with this extracted information.

Figure 10:
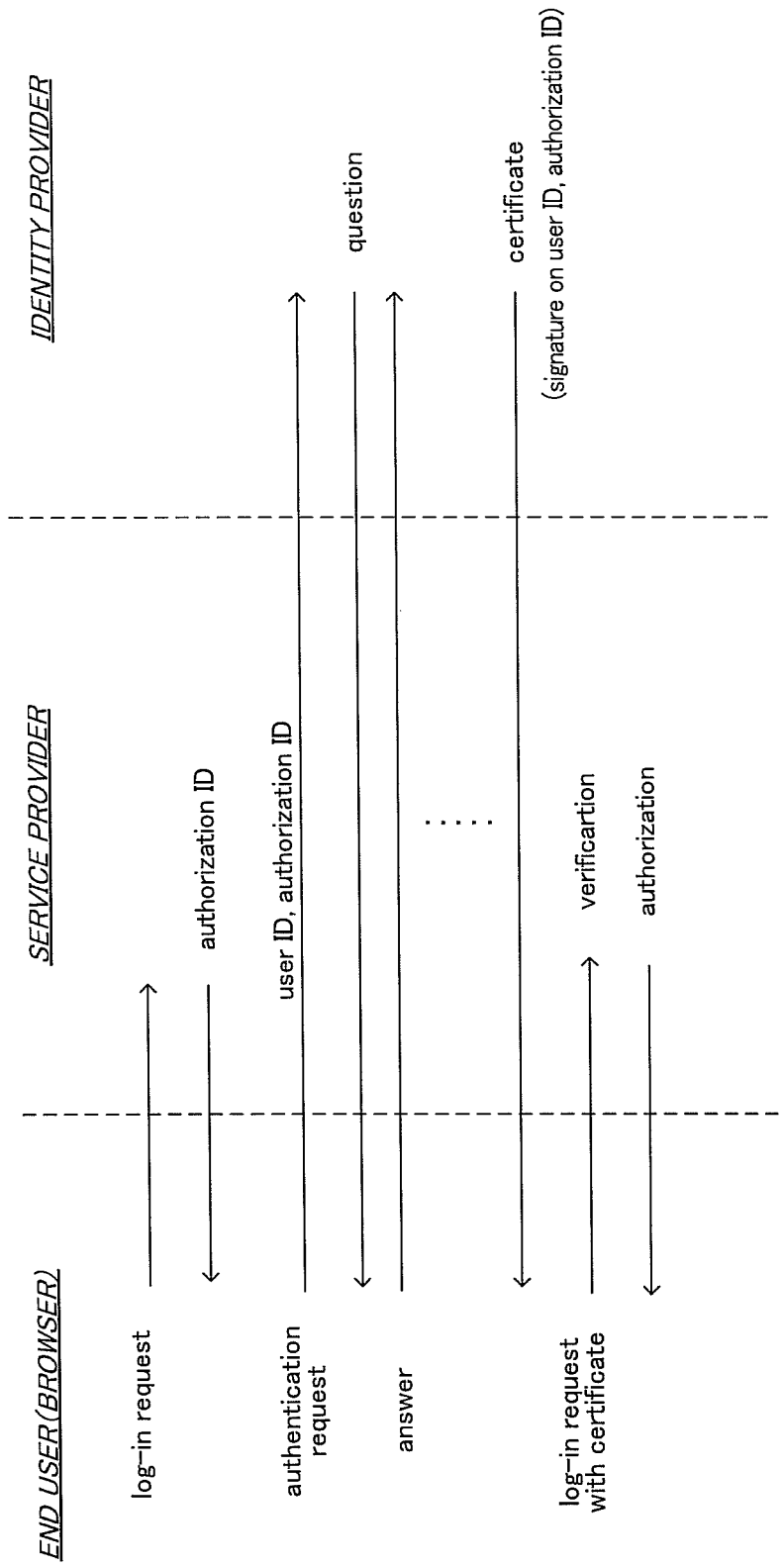
FIG. 10 is a view for explaining the operation of a visited location history matching server serving as an identity provider in a scenario that a user logs in a service provider through a browser by the use of the identity provider.

The user similarity provision method of the embodiment 1 is implemented with the visited location history matching server 1 which manages the location information histories of a number of users. A system in which the location information histories of individuals are accumulated can be used as an identity provider capable of authenticating user identities by the use of the location information histories. In what follows, the operation of the visited location history matching server serving as an identity provider will be explained with reference to FIG. 10 in a scenario that a user logs in a service provider through a browser by the use of the identity provider.

Incidentally, the service provider which performs a log-in process of users through identification by the identity provider has to store the URL and public key of the identity provider. The browser, the service provider and the identity provider communicate with each other through SSL.

Figure 11:
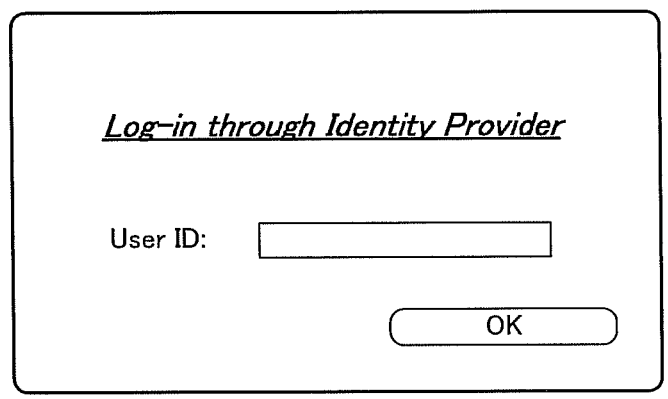
FIG. 11 is a view for showing a log-in dialog of the service provider to verify the identity of a user through the authentication by the identity provider.

First, the user accesses a log-in dialog of the service provider through the browser as shown in FIG. 11. The log-in dialog includes a form in which the user can enter a user ID. When the user presses a transmit button after entering the user ID, an authentication request is redirected to the identity provider. This authentication request is transmitted to the identity provider together with the user ID, the URL of this service provider and an authorization ID.

This authorization ID is issued by the service provider and associated with the user ID and the identity provider. Also, the authorization ID is effective only for a predetermined effective period, for example, twenty minutes. The user has to finish the log-in process within this effective period. Next, an authentication process is performed between the browser and the identity provider as follows.

Figure 12:
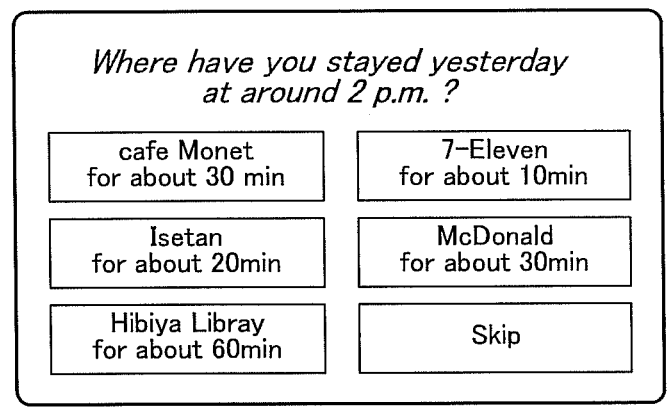
FIG. 12 is a view for showing a question dialog in which a multiple-choice question is displayed by the identity provider.
Figure 13:
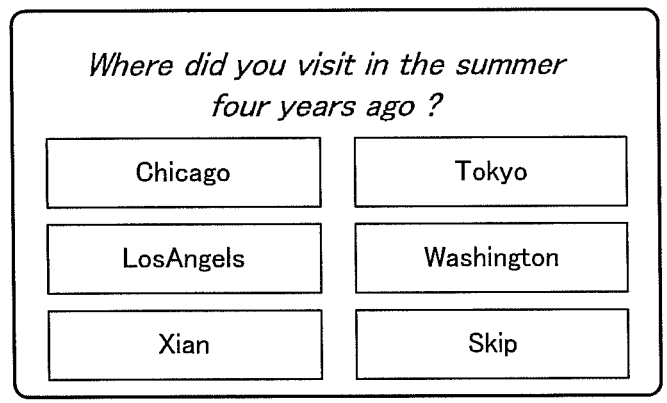
FIG. 13 is a view for showing another question dialog in which a multiple-choice question is displayed by the identity provider.

First, the identity provider opens a question dialog as illustrated in FIG. 12 or FIG. 13 in which is displayed a multiple-choice question which is related to the location information history of the user and which can correctly be answered only by that user. The multiple-choice question which is related to the location information history are based on information about, for example, in what place (which nation, which country, which city, which area, which establishment, which mountain, which beach or the like), at what time (what hours before, what days before, what month, what season, what year or the like) and for what length of period (what minutes, what hours or the like) the user has stayed. The user can select one of a plurality of choices (five choice buttons and one skip button in this case) in response to a multiple-choice question.

The user is asked such five multiple-choice questions. If the user can correctly answer three or more out of the five questions, the user is authenticated. The five questions may include one or more question consisting only of incorrect choices. In this case, the correct answer is skipping that question.

If the user is authenticated, the identity provider generates an electronic certificate (RSA, ECDSA or the like), and redirects the browser to the URL of the service provider which receives the electronic certificate. This electronic certificate certifies the authentication of the user associated with the user ID and the authorization ID. After receiving the electronic certificate, the service provider verifies this certificate with the public key of the identity provider, and permits the user to log in the service provided by the service provider.

Next is a description of an example of how to generate multiple-choice questions from the location information history of the user to be authenticated. First, this location information history is searched for extracting two location records of today and/or yesterday which indicates that the user has stayed in certain places respectively for 10 to 20 minutes. Since the location records are very fresh, the user will remember the details of the events on these days.

Accordingly, for example, a location record extracted may generates a choice that "you have stayed yesterday near the cafe Monet at around 2 p.m. for about thirty minutes".

Next, two location records within the past 7 days are extracted from the location information history in the same manner. Furthermore, one location record is extracted from location records before that. However, the older the location record is, the more distant from the usual moving range the selected place is. Also, if the location record is very old, for example, several years old, the question uses long time units such as "Spring in 20XX".

After extracting five location records from the location information history of the user, four incorrect location records are selected for each extracted location record to construct one question. Each incorrect location record is obtained by selecting another user at random, selecting one incorrect location record candidate of this another user at random, and confirming this candidate is truly an incorrect location record. The confirmation is performed by fuzzy searching the location information history of the user to be authenticated for each incorrect location record candidate. If a location record is hit in the location information history, this candidate is discarded followed by selecting another candidate.

On the other hand, while each multiple-choice question has six choices (including skip), there is inserted one question per six questions consisting only of incorrect choices. For example, a correct location record extracted may be modified as an incorrect choice that "You have stayed yesterday near the cafe Monet at around 12 a.m. for about thirty minutes" by slightly changing the correct location record in order that the user can notice. In this case, the correct answer is a skip.

Embodiment 2

In this embodiment, the current location information of a mobile communication device is periodically measured by the resident program installed in this mobile communication device in the same manner as described in the embodiment 1. However, in this embodiment, the location information as measured is stored in a database provided within the mobile communication device. The configuration of this database is the same as the history table as illustrated in FIG. 2. The current location information is accumulated in the same manner as in the embodiment 1 except that the history table is located in each mobile communication device and that the current location table is not used, and therefore no redundant description is repeated.

Namely, the resident program installed in the mobile communication device 3A of FIG. 1 collects the current location information thereof acquired by GPS or the like in a memory of the mobile communication device 3A. Also, the resident program installed in the mobile communication device 3B of FIG. 1 collects the current location information thereof acquired by GPS or the like in a memory of the mobile communication device 3B. The resident program of the embodiment 2 is provided with a visited location history matching function which is similar as that of the embodiment 1.

Figure 14:
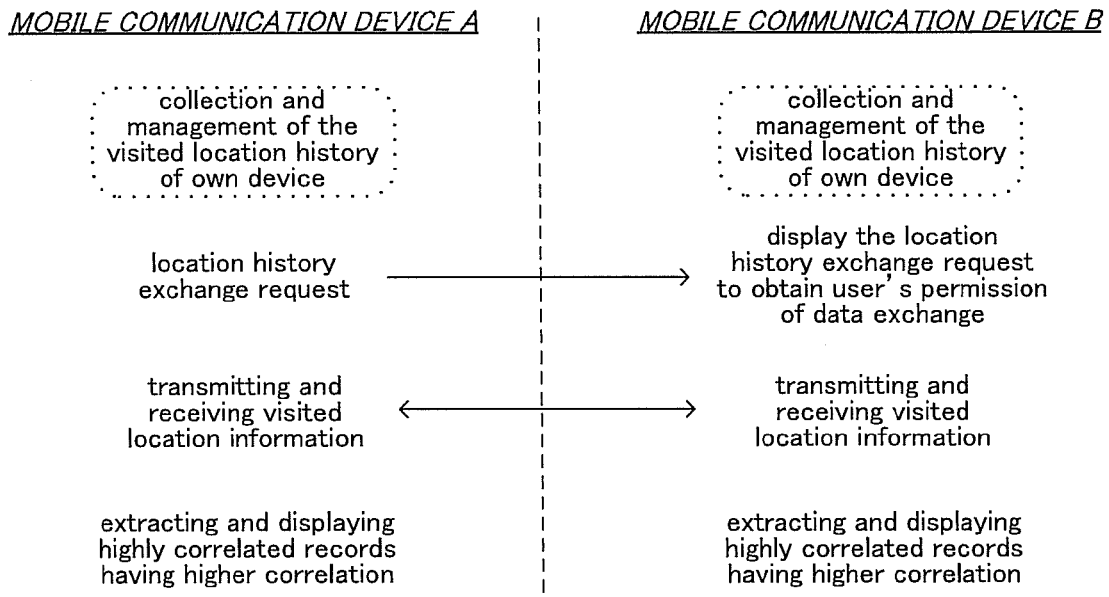
FIG. 14 is a view for explaining the information exchanging scheme of the user similarity provision method in accordance with an embodiment 2 of the present invention.

Next, the user similarity provision method of this embodiment will be explained in accordance with an actual usage scenario. FIG. 14 is a view for explaining the information exchanging scheme of the visited location history matching system. It is assumed that the user A with the mobile communication device 3A is attending a party and meeting the user B with the mobile communication device 3B for the first time. The user A proposes exchange of information for visited location history matching. The user B agrees and exchanges visited location history information with the user A through bluetooth, Wi-Fi Direct or the like communication device. Specifically speaking, first, the mobile communication device 3A transmits a location history exchange request to the mobile communication device 3B. The mobile communication device 3B displays this request with an OK button (not shown in the figure) which is pressed by the user B, followed by exchanging the location information histories between the user A and the user B.

Receiving the location information history of the mobile communication device 3B, the mobile communication device 3A compares these histories to extract the location records of the location information history of the mobile communication device 3B which correlate highly with the location records of the location information history of the mobile communication device 3A. The location records extracted are arranged in descending order of correlation with the visited location history of the mobile communication device 3A. This process is similar to that of the embodiment 1, and the list shown in FIG. 6 may be an example. The visited location history matching process is performed by the resident program of each mobile communication device. Incidentally, if the data amount of the location information history is too large, only the recent location records may be used.

Receiving the location information history of the mobile communication device 3A, the mobile communication device 3B performs the same process as described above so that the user B can view the similar information. With the common interests known from the correlated location records, the user A and the user B may have a nice chat. In other words, the location records extracted may be icebreakers of a real-life community.

As compared with the embodiment 1, this embodiment 2 is preferable in terms of security. Namely, in the case where the visited location histories of individuals are collected and controlled by the visited location history matching server, the reliability of the system shall be substantially damaged once information leak occurs. However, in the case of the embodiment 2, the risk is limited to the self-responsibility and the mutual trust between the user A and the user B.

Figure 15:
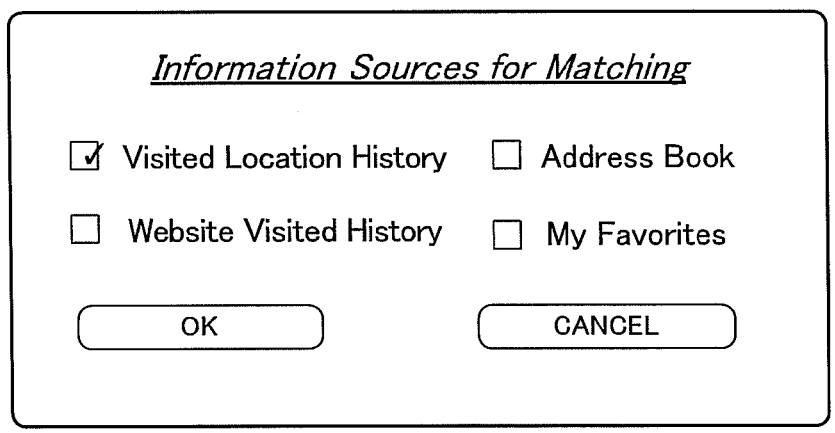
FIG. 15 is a view for showing a dialog through which a user can select additional information sources as options for extracting common interests shared between the users in accordance with the embodiment 2 of the present invention.

This user similarity provision method compares the visited location histories of two users provides the one user with the interests of the other user that are shared between these users. However, in addition to the location information histories, it is possible to use other information sources for extracting common interests shared between the users. Such information sources includes the visited history of website views, browser favorites (bookmarks) and the registered addresses of an address book. One or more information sources can be selected, for example, through a dialog shown in FIG. 15. For example, when the visited history of website views is selected, URLs commonly contained in the visited histories of website views of the two mobile communication devices are extracted. However, URLs of search engines are excluded from the search process. If common URLs are extracted, data is downloaded from these URLs followed by displaying the titles of pages as information about common interests. When browser favorites are selected, the browser favorites of the two mobile communication devices are matched in the same manner to display the page titles of the common URLs. When address book is selected, mutual acquaintances can be found by matching the address books of the two mobile communication devices. In this case, the mutual acquaintances are displayed on each mobile communication device in the names registered in this mobile communication device.

Furthermore, the aforementioned method for exchanging information is preferred from the view point of privacy concerns. For example, if one user likes fishing, his personal information about fishing is not disclosed to the other user unless this other user also likes fishing. Namely, only information about common interests is exchanged. Incidentally, it is not exceptional that there is no common data item in the visited history of website views, browser favorites and the registered addresses of an address book, and thereby one user can not know which sources the other user has selected.

Furthermore, in addition to the above information sources, any appropriate other user specific information may be used as information sources. For example, the data of a schedule may be used for this purpose which may include information about the interests of the user other than location information.

Embodiment 3

In this embodiment, the current location information of a mobile communication device is periodically measured by the resident program installed in this mobile communication device and stored in a database of this mobile communication device in the same manner as described in the embodiment 2. However, it is performed by a visited location history matching server to compare and match the location information histories and extract correlated location records. This visited location history matching server does not store location information histories but only matches the location information histories transmitted from mobile communication devices.

Figure 16:
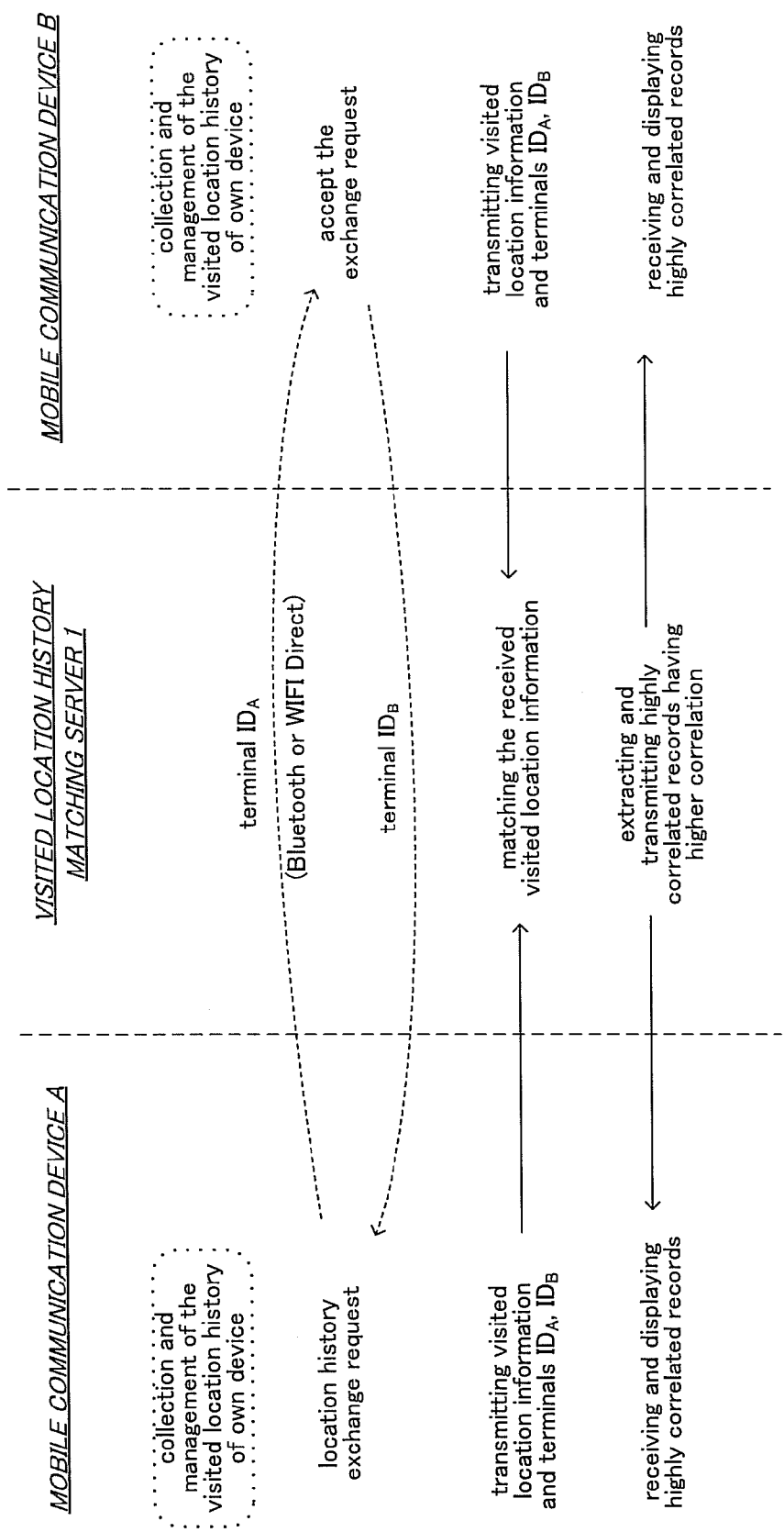
FIG. 16 is a view for explaining the information exchanging scheme of the user similarity provision method in accordance an the embodiment 3 of the present invention.

The visited location history matching system of this embodiment will be explained as follows in accordance with an actual usage scenario. FIG. 16 is a view for explaining the information exchanging scheme of the visited location history matching system. It is assumed again that the user A with the mobile communication device 3A is attending a party and meeting the user B with the mobile communication device 3B for the first time. The user A proposes exchange of information for visited location history matching. The user B agrees and receives a history exchange request from the user A through bluetooth, Wi-Fi Direct or the like communication device. The mobile communication device 3A and the mobile communication device 3B then exchange the terminal IDs thereof.

Next, the mobile communication device 3A and the mobile communication device 3B transmit the location information histories stored therein to the visited location history matching server respectively together with their terminal IDs. Receiving the histories and the terminal IDs, the visited location history matching server compares the histories and extract correlated location records. The location records extracted are arranged in descending order of correlation and displayed on the mobile communication device 3A and the mobile communication device 3B respectively. This process is performed in the same manner as that of the embodiment 1, and the list shown in FIG. 6 may be an example.

From the view point of users, the functionality of the embodiment 3 is substantially the same as that of the embodiment 2. However, the location information history is not transmitted to the other mobile communication device but transmitted only to the visited location history matching server. Only correlated location records are exchanged between the pair of mobile communication devices. The visited location history matching server deletes the location information histories after matching. Even if they meets for the first time, this system can be easily utilized without being concerned about security. Also in this case, if the data amount of the location information history is too large, only the recent location records may be used.

Embodiment 4

In this embodiment, the location information histories stored in the database of the embodiment 1 is used for exchange of information among users. For example, it is assumed that a user wants to know the end time of the jazz festival held on Aug. 28, 2011. In that case, a user search dialog of the resident program can be used for this purpose as illustrated in FIG. 17. The user search dialog may be opened, for example, by clicking a User Search button shown in FIG. 5.

The user can designate a place, a date, a time and a staying period as search terms in the user search dialog. For example, when the user enters "The Honmoku Local Park in Yokohama", "2011/08/28", "12:00" and "2:00" into the user search dialog followed by clicking a Search button, user search results are displayed, for example, as illustrated in FIG. 18. The search results are preferentially displayed from the location record closely related to the input search terms and having a longer staying period.

Figure 19:
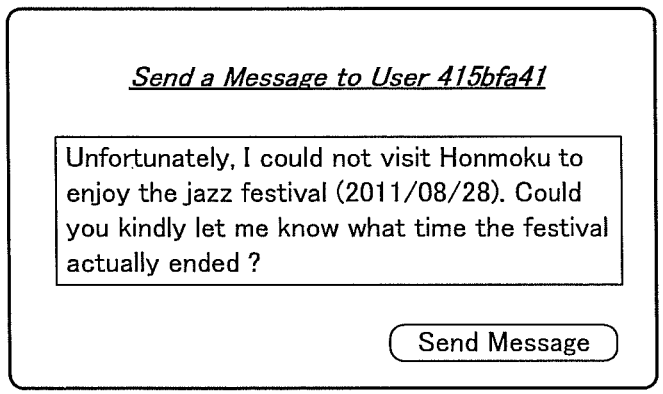
FIG. 19 is a view for showing a message edit screen for sending a message to another mobile communication device in accordance with the embodiment 4 of the present invention.
Figure 20:
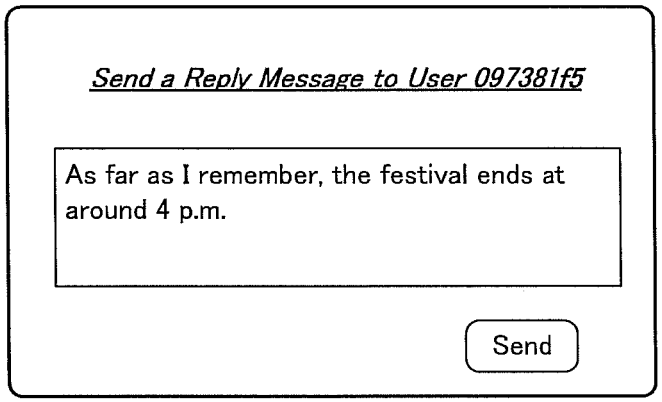
FIG. 20 is a view for showing a message edit screen for sending a reply message in accordance with the embodiment 4 of the present invention.

If a terminal ID "415bfa41" is clicked, a message edit screen is opened as illustrated in FIG. 19. After inputting a message to the message edit screen, the user can send the message to the mobile communication device of the terminal ID "415bfa41" by clicking the "Send Message" button. In response to this, a reply message may be returned as illustrated in FIG. 20. It is therefore possible to provide a new way for finding information associated with a particular place and a particular time.

Figure 21:
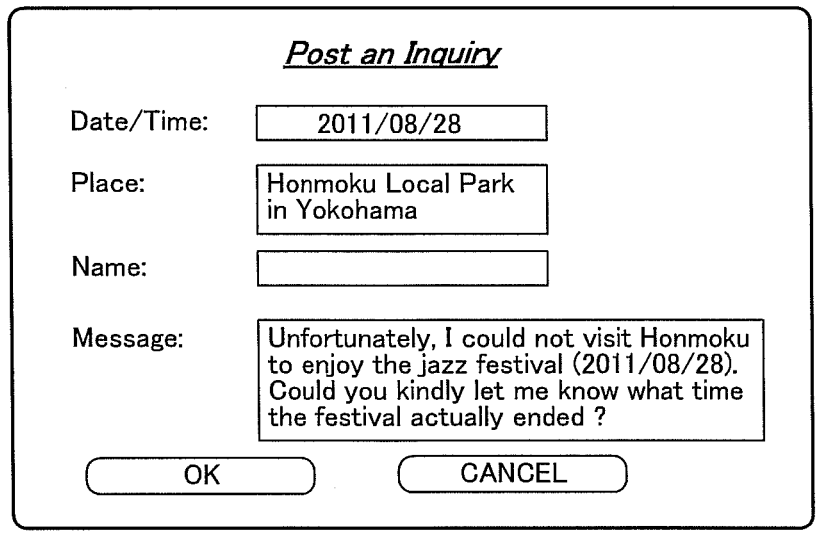
FIG. 21 is a view for showing a message edit screen for posting an inquiry message to a BBS in accordance with the embodiment 4 of the present invention.

The information exchange in the above example is closed in the exchanging users in the same manner as usual email exchange. The information exchange can be opened by the use of a BBS (Bulletin Board System) to more effectively utilize information accessible to the public. This BBS has the following functions in addition to the basic functions of an usual BBS. When posting a message, a user has to select either an inquiry message or a simple message. If an inquiry message is selected, a date and a place have to be designated, and these date and place are set as the name of a thread to be started from this message. FIG. 21 shows an example of an inquiry message edit screen. In this case, the name of a thread is "2011/08/28: Honmoku Local Park in Yokohama".

When an inquiry message is posted, the BBS searches the location information history database for location records corresponding to the date and place of the inquiry message to identify the user(s) corresponding to the location records. When the mobile communication device of the identified user(s) accesses the server for transmitting location information by a resident program, the resident program is notified by the server that the user is identified followed by displaying the thread of the BBS corresponding to the inquiry message as illustrated in FIG. 22.

The screen of the BBS includes a "POST" button which can be pressed to open a reply message edit screen as illustrated in FIG. 23. The identified user can edit and send a reply message to answer the question. On the other hand, the BBS includes a search link which can be clicked to open a search screen as illustrated in FIG. 24. From this search screen, anyone can find information associated with a particular place and a particular time. Also, in advance of posting an inquiry message, a user is requested to search for a similar thread through this search screen.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

For example, if a high accuracy indoor positioning system is available such that it can be identified which floor the user is staying, the history database may include such detailed information in the history table. A location record includes this detailed information makes it possible, for example, to identify which office the user has stayed in a bank building.

Furthermore, in the case where the mobile communication device is equipped with an altimeter, the information about which floor the user is staying can be obtained on the basis of the detected altitude and sent to the visited location history matching server as the above detailed information.

Also, as used in this specification, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A user similarity provision method of providing information about similarities between first and second users who are using first and second mobile communication devices and enabling the first and second users to communicate with each other, each of the first and second mobile communication devices is capable of detecting a current location thereof as a visited location, said method comprising the steps of:

periodically acquiring a current position of the first mobile communication device in association with a current time and accumulating a first visited location history of the first mobile communication device on the basis of the acquired current position and time, wherein the first visited location history consists of a plurality of visited location records, and each of the plurality visited location record consists of a visited location and a visit time;

periodically acquiring a current position of the second mobile communication device in association with a current time and accumulating a second visited location history of the second mobile communication device on the basis of the acquired current position and time, wherein the second visited location history consists of a plurality of visited location records, and each visited location record consists of a visited location and a visit time;

extracting similar visited location records from the first visited location history, wherein each of the similar visited location records satisfies a predetermined similarity relationship with at least one of the plurality of visited location records of the second visited location history, the predetermined similarity relationship indicating similarity between at least one of the plurality of visited location records by comparing the first and second visited location histories;

displaying the similar visited location records on the second mobile communication device as the mutual similarities on the basis of the similar visited location records extracted by the extracting step for providing the second user with one or more interests of the first user that are shared between the first and second users; and displaying an interface on the second mobile communication device for enabling the second user to send a message to the first user and make contact with the first user.

2. The user similarity provision method of claim 1 wherein the predetermined similarity relationship requires that the distance between visited locations is no greater than a predetermined distance.

3. The user similarity provision method of claim 1 wherein the visited location is represented by the degrees of latitude and longitude.

4. The user similarity provision method of claim 1 wherein each visited location history includes a staying period for which the mobile communication device has stayed in the visited location of a visited location record.

5. The user similarity provision method of claim 4 wherein the staying period of each visited location record corresponds to the differential visit time between this each visited location record and the visited location record subsequent to this each visited location record.

6. The user similarity provision method of claim 4 wherein, of the similar visited location records, a records having a staying period overlapping the staying period of the corresponding visited location record of the second visited location history for a longer period is given a higher priority.

7. The user similarity provision method of claim 1 wherein each of the first and second mobile communication devices detect the current location by the use of a GPS, Wi-Fi triangulation, cell phone tower triangulation or any combination thereof.

8. The user similarity provision method of claim 1 wherein each of the first and second mobile communication devices is capable of accessing the Internet, and wherein the visited location records are transmitted from each of the first and second mobile communication devices to a visited location history matching server on the Internet, and accumulated as a visited location history in the visited location history matching server.

9. The user similarity provision method of claim 8 wherein there are a plurality of mobile communication devices each of which is the first mobile communication device and located in the vicinity of the second mobile communication device.

10. The user similarity provision method of claim 1 wherein the first visited location history is stored in the first mobile communication device, and the second visited location history is stored in the second mobile communication device.

11. The user similarity provision method of claim 8 wherein the visited location history matching server performs the step of extracting the similar visited location records from the first visited location history in response to a search request transmitted from the second mobile communication device, and returns the similar visited location records to the second mobile communication device.

12. The user similarity provision method of claim 10 wherein the first mobile communication device and the second mobile communication device are connected to each other, and wherein the first mobile communication device and the second mobile communication device exchange the visited location records of the first location information history and the visited location records of the second location information history with each other, that the second mobile communication device performs the step of extracting the similar visited location records from the first visited location history and the step of displaying the similar visited location records on the second mobile communication device, and that the first mobile communication device performs the step of extracting the similar visited location records from the second visited location history and the step of displaying the similar visited location records on the first mobile communication device.

13. The user similarity provision method of claim 10 wherein the first mobile communication device and the second mobile communication device are connected to the Internet, and wherein the first mobile communication device and the second mobile communication device transmit the visited location records of the first location information history and the visited location records of the second location information history respectively to a visited location history matching server which is connected to the Internet and performs the step of extracting the similar visited location records from the first visited location history and transmits the similar visited location records to the second mobile communication device.

14. The user similarity provision method of claim 1 wherein when the second user performs transmission of a message through the interface displayed on the second mobile communication device, the second mobile communication device transmits the message to the visited location history matching server which then transfers the message to the first mobile communication device.

* * * * *